(No Model.)

A. WANNER, Jr.
BOTTLE TOP.

No. 538,092. Patented Apr. 23, 1895.

WITNESSES:
Edward Thorpe
P. B. Turpin

INVENTOR
Albert Wanner Jr.
BY Munn & Co.
ATTORNEYS.

UNITED STATES PATENT OFFICE.

ALBERT WANNER, JR., OF NEW YORK, N. Y.

BOTTLE-TOP.

SPECIFICATION forming part of Letters Patent No. 538,092, dated April 23, 1895.

Application filed June 19, 1894. Serial No. 515,045. (No model.)

*To all whom it may concern:*

Be it known that I, ALBERT WANNER, Jr., of New York, in the county and State of New York, have invented a new and Improved Bottle-Top, of which the following is a full, clear, and exact description.

The invention relates to covers or caps for salt cellars, pepper boxes and other bottles, and its object is to provide a new and improved bottle top, which is comparatively simple and durable in construction, forms a permanent fixture on the mouth of the bottle, and is arranged to permit of conveniently opening the bottle, for filling the same with the desired substance, and to form a perforated cap for the exit of the contents of the bottle in a divided state.

The invention consists in certain parts and details, and combinations of the same, as will be hereinafter fully described and then pointed out in the claim.

Reference is to be had to the accompanying drawings, forming part of this specification, in which similar letters of reference indicate corresponding parts in all the views.

Figure 1:
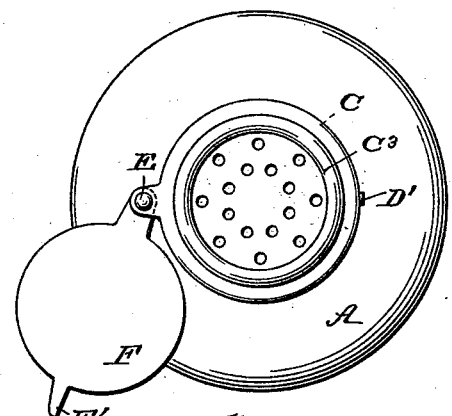
Figure 2:
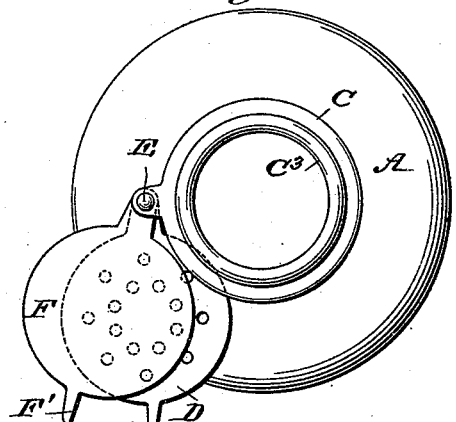

Figure 1 is a plan view of the improvement with the imperforate plate open. Fig. 2 is a like view of the same, with the cover and perforated plates in an open position; and Fig. 3 is a sectional side view of the same with the two plates in a closed position.

Figure 3:
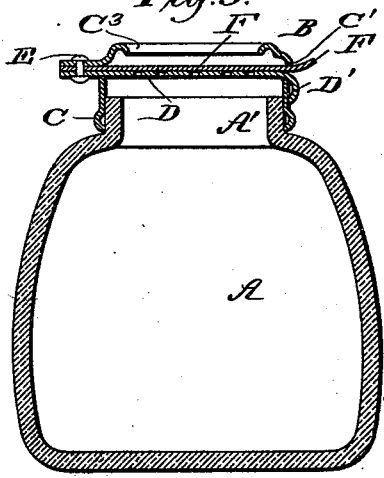

As illustrated in Figs. 1, 2 and 3 the bottle is provided on its neck A' with a cap B, having a neck band C cemented or otherwise secured to the neck A' of the bottle A. On the neckband C is arranged a perforated plate D and an imperforate cover plate F held laterally movable on the neck band, and being for this purpose pivoted at E to the said neckband, as plainly illustrated in the drawings. The perforated plate D and imperforate plate F are adapted to pass through a slot C' formed in one half of the neckband C, so as to permit of opening and closing the said plates D and F, as illustrated in Figs. 1 and 2. The free end of the plate D is provided with a projection forming a handle D', and the plate F has a handle or hand hold F' adapted to be taken hold of by the operator, for imparting a swinging motion to the plates, so as to open or close the same either independently or jointly as may be desired.

By the use of the cover plate F the bottle may be entirely closed as the said cover plate closes the perforations in the plate D, as shown in Fig. 3. Thus it will be seen that the entire cap is a permanent fixture on the bottle A, and need not be removed for filling the bottle, as is the case with similar devices now employed for the same purpose.

When it is desired to fill the bottle A, both plates F and D are swung into an outermost position, as shown in Fig. 2, and when it is desired to use the bottle for removing the contents in a finely divided state, then the cover plate F is swung into an outermost position while the perforated plate D is in a closed position, as illustrated in Fig. 1.

As illustrated in the drawings, the upper end of the neck band C is formed with an annular flange $C^3$, curved upward and downward, see Fig. 3, to extend over the perforated plate D or the plate F, so as to form a mouth for the cap.

An important feature of my invention is the construction whereby the upper end of the neck piece is complete and uniform throughout its circumference. This is not only desirable as a matter of finish, but also provides a brace or guard for the swinging plates which protects the edge of such plates when they are in a closed position.

Having thus described my invention, what I claim is—

The improved bottle top herein described consisting of the neck band having its upper end complete and unbroken throughout its circumference and provided below said end with a lateral opening or slot and the perforated and imperforate plates pivoted at one edge and movable through the slot, independently into and out of register with the neck band and provided with edge finger holds whereby either or both may be swung, all substantially as and for the purpose set forth.

ALBERT WANNER, JR.

Witnesses:
C. SEDGWICK,
F. W. HANAFORD.